United States Patent Office 3,278,519
Patented Oct. 11, 1966

3,278,519
FORMED PRODUCTS OF CELLULOSE CRYSTALLITE AGGREGATES
Orlando A. Battista, Drexel Hill, and Patricia A. Smith, Parkside, Chester, Pa., assignors, by mesne assignments, to FMC Corporation, San Jose, Calif., a corporation of Delaware
No Drawing. Filed May 6, 1960, Ser. No. 27,268
3 Claims. (Cl. 260—212)

This application is a continuation-in-part of application Serial No. 823,081, filed June 26, 1959, now abandoned.

This invention relates to formed products of cellulose crystallite aggregates, and more particularly of mechanically disintegrated cellulose crystallite aggregates having a level-off D.P. (degree of polymerization).

As described below, formed products are obtainable having a thermal resistance and physical strength of magnitudes not heretofore observed in cellulosic materials. The products are of further interest in respect of their high density, good electrical properties, flexibility of formation, and fabrication ease.

Essentially, and in brief, the invention comprises formed plastic structures comprising mechanically disintegrated cellulose crystallite aggregates disposed sufficiently close together that the aggregates are interfacially bonded by means of intermolecular bonding forces. The invention further comprises methods of forming the products.

Considering first the cellulose crystallite aggregates, these are products obtained by the controlled acid hydrolysis of cellulose, there being formed an acid-soluble portion and an acid-insoluble portion. The latter comprises a crystalline residue or remainder which is washed and recovered, being referred to as cellulose crystallite aggregates, or as level-off D.P. cellulose. These aggregates, in the state resulting from the hydrolysis and washing steps, in which state they may be designated as-formed aggregates, are then preferably subjected to mechanical disintegration, as described below, to convert them to a form in which they have increased value, according to the invention. It being apparent that the as-formed aggregates are the precursors of the disintegrated aggregates, the preparation and characteristics of the former will be described in some detail.

In the acid hydrolysis, the acid dissolves amorphous portions of the original cellulose chains, the undissolved portions being in a particulate, non-fibrous or crystalline form as a result of the disruption of the continuity of the fine structures between crystalline and amorphous regions of the original cellulose. Although hydrolysis may be effected by various specific methods, including the use of various acids, a direct method which is free of secondary reactions comprises the treatment of the original cellulosic material with 2.5 normal hydrochloric acid solution for 15 minutes at boiling temperature. Another suitable method comprises treating the cellulosic material with 0.5% hydrochloric acid solution (0.14 normal) at 250° F. for 1 hour. The cellulose undergoing such treatment reaches, within the time period noted, a substantially constant molecular weight, or in other words, the number of repeating units or monomers, sometimes designated anhydroglucose units, which make up the cellulosic material, becomes relatively constant, from which it is apparent that the degree of polymerization of the material has leveled off, hence the name level-off D.P. cellulose. In other words, if the hydrolysis reaction were continued beyond the period noted, the D.P. would change very little if at all. In all cases, the level-off D.P. value reflects the fact that the destruction of the fibrous structure has occurred as a result of the substantially complete removal of the amorphous regions of the original cellulose.

It may be observed that "crystallite," as used herein, is a cluster of longitudinally disposed, closely packed cellulose chains or molecules, and the "aggregates" are clusters of crystallites. The aggregates may also be said to comprise straight, rigid, relatively non-twistable groups of linear chains. As indicated by X-ray diffraction tests, the crystallites and crystallite aggregates have a sharp diffraction pattern indicative of a substantially crystalline structure. Although the crystallite chains are of very uniform lengths, particularly by comparison with the original cellulose chains, strictly speaking they do exhibit some variation, and for this reason it is preferred to speak of average length, or of average level-off D.P. values.

The hydrolysis methods noted above are particularly characterized in that in each crystallite aggregate resulting from the hydrolysis, no constituent chain is connected to a chain in a neighboring aggregate; rather, all the chains in an aggregate are separate from and free of those in neighboring aggregates.

The cellulose crystallite aggregates, or level-off D.P. cellulose, suitable for use in the invention is characterized by having a preferred average level-off D.P. of 125 to 375 anhydroglucose units. Ideally, within this range all of the material should have the same D.P., or chain length, but as this is difficult if not impossible to achieve, it is preferred that at least 85% of the material have an actual D.P. not less than 50 and not more than 550. More preferably, at least 90% of the material should have an actual D.P. within the range of 75 to 500, and it is still more preferred if at least 95% of the material has an actual D.P. in the range of 75 to 450. It may thus be apparent that the chain length of the level-off D.P. cellulose, or cellulose crystallite aggregates, is very uniform, a consequence of the hydrolysis, wherein the longer chains of the original cellulose were converted to shorter chains and the very short chains were dissolved away. In short, the hydrolysis effected a homogenization of the chain length distribution. As may also be apparent, a reference to crystallite aggregates having an average level-off D.P. of 125 means that the aggregates have an average chain length corresponding to 125 anhydroglucose units, and in accordance with the first preference noted above, at least 85% of this material will be made up of chains containing 50 to 550 such units; the remaining 15% may comprise shorter and/or longer chains.

More preferably, the average level-off D.P. is in the range of 200 to 300, of which material at least 90% has an actual D.P. in the range of 75 to 550.

Associated with the foregoing D.P. properties of the crystallite aggregates is the fact that their chemical purity is very high, the material comprising at least 95%, preferably at least 97% or 99%, polyglucose, or anhydroglucose units, based on chromatographic analysis. In terms of ash content, the aggregates preferably contain less than 100 p.p.m (parts per million), although ash may range from about 10 to about 400 or 500 or 600 p.p.m. By comparison, conventional fibrous cellulose may have 1000 to 4000 p.p.m. of ash. In connection with the purity of the aggregates, it may be explained that the inorganic contaminants in the original cellulose, which are concentrated in the amorphous regions thereof, are dissolved away by the hydrolyzing acid, and the non-cellulose components of the original material are so effectively destroyed that their concentration is reduced to a very low level. Of interest is the fact that the chains produced by the hydrolysis each have on one end thereof a potential aldehyde group, such group being in the 1 carbon position of an end anhydroglucose unit and requiring the assistance of the ring oxygen atom, which is ortho to it, to realize its aldehydic potential. The group has the reducing properties of an aldehyde group. On their other ends the chains have only hydroxyls as functional groups.

The source material for the crystallite aggregates may suitably be one or more natural fibers such as ramie, cotton, purified cotton, also bleached sulfite pulp, bleached sulfate wood pulp, etc. Particularly suitable are sulfite pulp which has an average level-off D.P. of 200 to 300, at least 90% of which has a D.P. in the range of 75 to 550; and also sulfate pulp which has an average level-off D.P. of 125 to 175, at least 90% of which is in the range of 50 to 450.

Other suitable cellulose crystallite aggregates may have lower average level-off D.P. values, say in the range of 60 to 125, or even 15 to 60. Aggregates from both of these ranges have the chemical purity, moisture content, particle size, and other characteristics note above. Crystallite aggregates in the 60 to 125 average level-off D.P. range are obtainable from the acid hydrolysis of alkali-swollen natural forms of cellulose, of which a preferred source is cellulose that has been mercerized by treatment with 18% caustic soda solution at 20° C. for two hours. Aggregates in the 15 to 60 average level-off D.P. range are suitably prepared from regenerated forms of cellulose, including tire and textile yarns, other regenerated cellulose fibers, and cellophane.

As obtained from the acid hydrolysis and water washing steps, the aggregates in the overall average level-off D.P. range of 15 to 375 are in a loosely aggregated state and, particularly in the larger sizes, say from 40 to 250 or 300 microns, are characterized by the presence of many cracks in their surfaces, including similar surface irregularities or phenomena like pores, depressions, voids, fissures and notches. Because of such irregularities, the apparent or bulk density of the aggregates is much less than their absolute density. Furthermore, the cracks and other irregularities persist despite the application of high compressive forces on the aggregates. Thus, when they are compressed at 5,000 p.s.i., they exhibit an apparent density of 1.26; at 10,000 p.s.i. the apparent density rises to 1.32; at 15,000 p.s.i. it is 1.34; and at 25,000 and 37,000 p.s.i it is 1.38 and 1.38, respectively. On the other hand, the absolute density of a unit crystal or crystallite is 1.55 to 1.57, from which it is apparent that the aggregates occlude considerable quantities of air in the surface cracks, voids, fissures, etc. The apparent densities of the dried disintegrated aggregates, at the compressive forces noted, are somewhat higher than the foregoing values.

The aggregates resulting from the hydrolysis and washing steps are further characterized by having a particle size in the range of 1 or 2 to 250 to 300 microns, as determined visibly by microscopic examination.

In most cases it is preferred to subject the foregoing product to mechanical distintegration, as described below, there being produced a material which, generally speaking, has a size in the range of less than 1 to about 250 or 300 microns. The disintegrated aggregates are then subjected to the product forming step.

Mechanical disintegration of the aggregates may be carried out in several ways, as by subjecting them to attrition in a mill, or to a high speed cutting action, or they may be forced through a multiplicity of fine holes so that they are subjected to an attriting or shearing action by entrance and passage through the openings as well as to the attriting action by virtue of being rubbed against each other under the influence of the applied force. The disintegration of the aggregates is carried out in the presence of an aqueous medium. Whatever method is used, the disintegration is carried out to such an extent that the resulting disintegrated aggregates are characterized by forming a stable homogeneous suspension in the aqueous medium in which they are being attrited, or in which they may be subsequently dispersed. By a stable suspension is meant one from which the aggregates will not settle out but will remain suspended indefinitely. The disintegrated aggregates are further characterized by the fact that such suspension forms an extremely adherent film when deposited on a glass panel or sheet or other suitable surface. At lower concentrations of aggregates, the suspension is a dispersion, while at higher concentrations it is a gel.

As described hereinafter, the product forming step is preferably carried out by using pressure, and it may be noted that disintegration or attrition of the aggregates also takes place during the step of compressing them, particularly of the larger, randomly disposed aggregates, at least some of which are reduced to a size of the order of one micron and smaller. In fact, the greater the pressure, the more particles will be obtained having a size of less than one mircon. At the same time, compression has the effect of orienting, or lining up, the smaller particles so that the faces of these latter aggregates are brought so closely together that the aggregates are held by intermolecular bonding forces, and a larger structure is formed. The density of such larger structure, or compressed shape, tends to approach the density of the crystallite aggregates. To facilitate the foregoing actions, and to increase the particle to particle contact, the compression of the aggregates may be carried out in a vacuum of any suitable magnitude.

The process of producing the formed products generally comprises attriting the aggregates either prior to, and/or during, the product forming operation. Usually a drying step follows the forming, although it may be carried out coincidently with or, less preferably, prior to the forming.

Generally, the forming step is accomplished in the cold, i.e., at room temperatures, by applying pressure, the amount of which is at least 5,000 p.s.i., although preferably it is 15,000 to 30,000 p.s.i., and more preferably 30,000 to 100,000 p.s.i. As the forming pressure increases, the density and hardness of the resulting product increase, and it progressively becomes more insensitive to moisture.

The forming pressure may extend to pressures on the order of 1 or 2 to 5 to 7 million p.s.i., in which case explosion compression or explosion compacting techniques are employed. At these last-mentioned pressures, the product density approaches the limiting value of about 1.57, which is the absolute density of a unit crystal or crystallite. The hardness of the product is very great, and in other respects the product is quite unusual. Owing to its great heat resistance, hardness, and impact strength, its use as a mold is contemplated, particularly where great resistance to heat and pressure are desired.

The drying step may be carried out at temperatures ranging from room to about 100° C., preferably at 20 to 30° C. Drying conditions which tend to produce steam should be avoided. Usually, the less water left in the pressed product, the greater is its resistance to moisture.

A number of more or less specific procedures are available for making the product. According to a preferred method, wet or never dried crystallite aggregates are subjected to mechanical disintegration or attrition, then to a pressing step, and the pressed product is then dried. Preferably the aggregates are pressed under conditions that will permit at least a portion of the water to escape therefrom, as by at least partially enclosing them by means of a water permeable member or device. The resulting product is usually at least translucent and it approaches transparency as the particle size of the aggregates becomes smaller. The product is characterized by having a very uniform structure, and may be made extremely tough and hard. It has good resistance to moisture. Usually the surfaces of the product are glossy, and they are capable of receiving an even glossier finish as by subjecting them to a suitable buffing operation.

In the foregoing procedure, the aggregates resulting from the attrition step may have an over-all particle size in the range of less than 1 to 250 or 300 microns, and this material may be subjected to the pressing step. It is possible, and in many cases is a desirable procedure, to fractionate the attrited aggregates before compressing, and thus press, say, a fraction having particles of up to 1 or 2 microns, or up to 5 or 10 microns, or of any other desirable size and size distribution. Furthermore, the aggregates-water mixture subjected to attrition, and prior to pressing, may have a consistency of 3 to 90% solids, and preferably 35 to 80 or 90%.

Another preferred procedure comprises subjecting the wet or never-dried aggregates, having any desirable particle size and size distribution, to compression, preferably under conditions permitting the escape of water, and then drying the pressed product, there being obtained a hornified material having a very smooth, glossy surface.

Still another preferred method comprises attriting the wet as-formed aggregates, say at a consistency of 5 to 35% solids to form a wet gel, and thereafter drying the gel at atmospheric pressures to produce a tough, hornified product. Similarly, an aggregates-water mixture of 35 to 80 or 90% consistency may be attrited, and the resulting mixture dried to yield a particulate form, more or less, of highly hornified pieces or pellets of variable shape; they are of value as non-conducting material in circuit breakers.

In still another variation, the never dried aggregates may be attrited and then subjected to a coincident pressing and drying step. In this case the product is not only hornified but has an ivory-like or pearly appearance.

In another procedure the dried aggregates, disintegrated or not, may be subjected to pressure, there being produced a product which, while not glossy or pearly, is nevertheless useful.

Generally, the wet aggregates may be compressed at lower pressures than the dried to achieve a comparable bonding effect in the product. Also, pressing may be done at higher temperatures if desired, say room to 100 or 150° C., or more, to favor hydrogen bonding, but is conveniently performed at room temperatures. The aggregates do not flow under the influence of pressure.

While the foregoing procedures provide products having a gradation of properties, all products have several common features. Thus, all are unitary 3-dimensional plastic materials. All comprise attrited and dried aggregates. In all of them, the aggregates particles, because of the purity of the crystallities and the forcing into close association by means of pressure or surface tension, of the free hydroxyl groups on their surfaces, are considered to be interfacially bonded. More particularly, and without being bound by theory, it is considered that the crystallite planes are sufficiently clean to permit very intimate lateral packing of the crystallites, so that intermolecular bonding occurs; for example, hydrogen bonding forces between adjacent lateral OH groups on the crystallite surfaces become engaged, and Van der Waals forces are believed to be involved. It is thought that these intermolecular bonding forces are predominant at pressures above 25,000 p.s.i. and densities above 1.4; in any case they help account for the great cohesiveness of the product; moreover, such forces cooperate with mechanical interlocking forces, which are prevalent at lower pressures, to give a product which is quite dense, extremely strong and hard, and unusually resistant to high temperatures. For example, pressed discs in their as-formed state, made as described, can be pounded with a hammer without breaking, and they will not receive nails; the nail bends under the hammer rather than penetrate the disc. Furthermore, a half-inch disc can withstand contact by an oxyacetylene flame (3100 to 3300° C.) for periods of 12 to 20 seconds without being pierced. The flame resistance increases as the disc thickness increases. Furthermore, there is very little conductivity of heat to the underside of the disc. The flame gradually destroys the material of the disc but only at the point of contact. The material does not melt. In the arc plasma, (10,000° K.), a half-inch thick disc pressed at 10,000 p.s.i. exhibits an erosion rate (2.4) which is less than that of polytetrafluoroethylene or Teflon (6.4), or of vulcanized fiber (2.7), and moreover, carbon is not deposited on it.

It may be observed that the density of products pressed at 10,000 p.s.i. is about 1.30 to 1.39 and at 25,000 p.s.i. it may be 1.38 to 1.43. Other preferred ranges are 1.0 or 1.2 to the absolute density of a cellulose crystallite, namely 1.54–1.57. The Izod impact strength of a bar pressed at 25,000 p.s.i. is in the range of 0.75 to 1.0 ft. lbs./in. of notch, and, for more highly pressed products, may range to 5, 10, or more ft. lbs./in. The heat conductivity of a product pressed at 10,000 p.s.i. is 1.75 B.t.u./in./sq. ft./° F./hr., while the specific heat is 0.4 B.t.u./lb./° F. It may be noted that these characteristics are superior to those of vulcanized fiber.

As an example of the hardness, a material pressed at 37,000 p.s.i. has a hardness which is comparable to that of conventional vulcanized fiber and superior to that of a conventional commercial molded product made from about 65% urea-formaldehyde resin and about 35% alpha-cellulose as filler. The less hard materials are readily machinable on conventional equipment.

The products have useful electrical properties; for example, for a material pressed at 10,000 p.s.i. the dielectric constant is 6.1 at 57% R. H., 75° F., 1,000 c.p.s., and 56.4 at 95% R. H., 75° F., 1,000 c.p.s.; and the dissipation factor is 0.031 at 57% R. H., 75° F., 1,000 c.p.s., and 0.402 at 95% R. H., 75° F., 1,000 c.p.s.

Some of the products particularly those formed by pressing wet aggregates and then drying, acquire a glossy ivory-like appearance and are buffable to an even higher gloss. These particular products tend to be more water resistant; when immersed in water they retain their form and shape for a considerable period, in time becoming somewhat rubbery to the touch before eventually disintegrating. They are resistant to humid atmospheres.

The compressed aggregate products are of value in applications requiring great thermal resistance and outstanding strength, as for example in the wall portions, including the nose cones, of guided missiles, preferably as an intermediate layer. A further advantage for these and other installations is that the products may be made of any suitable desired thickness. Other useful applications include thermal insulating materials in building, automotive, and equipment construction, safes, and the like.

In respect of moisture resistance it is interesting to note that the aggregates, in powder form, possess the lowest moisture regain of any known form of cellulose, namely, 5.7% moisture regain at 58% relative humidity and 72° F. as compared with up to 13% moisture regain for other forms of cellulosic materials. At 40 and 80% R. H., the aggregates have a moisture regain of 4.2 and 8.4%, respectively. When pressed into a disc at 10,000 p.s.i., the moisture regain of the aggregates is 3.8% at 58% R. H. and 72° F. The moisture resistance increases with the forming pressure.

To maintain the pressed products in a moisture resistant state, and to preserve their properties of heat resistance, physical strength, dielectric strength, etc., they should be protected against prolonged exposure to humid atmospheres, moisture, dampness, etc. While they have value in non-protected installations, such value and use is not permanent. However, in protected installations their value and use are long lasting. For example, in thermal applications the products may be externally covered by a suitable layer or coating which is permanently water resistant, such as an aluminum steel, or other metal sheet or sheath, or a resin coating, for which there may be used any of the resins described below.

In some cases, the pressed product may comprise an intermediate layer or wall of a given structure, such as a safe; that is, in its normal use it may be disposed between a pair of layers or walls that are moisture resistant, and thus it will not require special handling.

Increased moisture resistance of the product during exposure to the atmosphere may also be obtained, without any appreciable sacrifice of the other noted properties, by mixing the cellulose crystallite aggregates, prior to forming of the product, with a minor amount of suitable moisture-resistant resin. Greater moldability also results. Incorporation of the resin may be made before or after attriting the aggregates, but should of course precede the pressing or forming step, which in this event is done at elevated temperatures as conventionally employed in resin molding procedures. The amount of resin should be sufficient to provide moisture resistance and suitably may range from 0.01 to 0.5 or 1 or 2%, although in some cases it can be higher, say to 5, 10, 15, 20 or 25%. By employing smaller amounts of resin, the heat resistance, hardness and impact strength of the pressed product are retained, particularly when such heat-resistant resins like polytetrafluoroethylene, polyformaldehyde, polyamides, etc., are used. Addition of the resin to the crystallite aggregates will usually require the application of heat coincidently with pressure in order to form the products. The resin may be a thermosetting or heat-hardenable resin, usually in the form of a precondensate or partial polymerizate such as phenol-formaldehyde resins. Other resins are alkyd resins; also protein plastics such as those made from casein and zein; epoxy resins; vulcanized polyisobutylene, etc. Thermoplastic resins include polyamides like nylon, polyurethanes, polyformaldehyde, polyolefins such as polyethylene, polypropylene, unvulcanized polyisobutylene, furans, fluoroethylene polymers, silicones, etc. The preferred resins are those which soften at 200° C. or higher.

Mixing of the aggregates with the resin may be carried out in any suitable way that will secure effective distribution and intermingling of the materials. In the case of thermosetting resins, liquid precondensates or resin syrups are usually employed and are made in the customary way. For example, formaldehyde and phenol are reacted in the presence of a suitable polymerization catalyst to form a resin syrup, and this is mixed with the cellulose crystallite aggregates. The resulting mixture, in the form of a hard lumpy material is disintegrated in a mill or other device to reduce the size, then dried, and it may be further reduced in size as by grinding in a ball mill or the like. Drying of the aggregate-resin mixtures may be done at temperatures up to, say, 150° C. for times ranging from a few seconds to a few minutes. The times are shorter at the higher temperatures. When the resulting composition is pressed and heated, the resin is brought to a fully condensed or cured state.

If desired, resins like phenol-formaldehyde may be condensed to solid form, reduced to a friable powder, mixed with the aggregates, and then blended on rolls, after which the mixture may be reduced to suitable size.

Thermoplastic resins may first be ground to powder, mixed with the aggregates, then blended on warm rolls to form a sheet, and the latter is then cooled and reduced to powder or granules.

It is practical to dissolve the resin in a suitable solvent and then to mix the resulting solution with the aggregates; or the dissolved resin may be precipitated on the aggregates. Another mixing procedure is to combine the aggregates, either in the form of a dispersion or a wet gel or attrited mixture, or a fraction thereof, obtained as described, with a resin syrup or resin solution, then mix the materials, and thereafter dry the mixture. Still another, and preferred, mixing procedure is to attrite or disintegrate the aggregates directly in the resin syrup or resin solution, or other form of liquefied resin, rather than in the aqueous medium as noted above, and subsequently to dry the attrited mixture. Very intimate mixing is provided by this last procedure.

The invention may be illustrated by the folowing examples.

*Example 1*

Viscose fiber was subjected to hydrolysis in a 2.5 normal HCl solution for 15 minutes at 105° C., filtered, and then washed with water until it was acid-free. The resulting crystallite aggregates had an average level-off D.P. of 40. The moisture content was about 5%. A mixture comprising 50% by weight of the aggregates in water was prepared having a particle size ranging from 1 to about 150 to 200 microns. Then a bronze, sintered metal, cylindrical mold equipped with a tight-fitting piston was mounted on the lower plate of a Carver press and 2 ml. of the aggregates-water mixture were placed in the hollow core or cavity of the cylindrical mold beneath the piston and pressure was applied to the piston by forcing the upper plate of the press against it. A pressure of 10,000 p.s.i. was applied, and it was noted that the water present in the mixture was forced through the porous walls of the mold, appearing on the outer surface. The pressure was relieved after a value of 10,000 p.s.i. was reached, and the material in the mold cavity was found to be in the form of a compressed paste or moist cake. The particle size of the paste was found by microscopic examination to be up to 3 microns. A portion of the compressed paste was dried in air, there being formed a translucent horn-like mass that was extremely hard and had the appearance of artificial ivory.

*Example 2*

A sample of regenerated cellulose obtained by the deactylation of cellulose acetate (Fortisan) was subjected to hydrolysis, using the conditions described in the preceding example, there being produced crystallite aggregates having an average level-off D.P. of 60. They were dried to a moisture content of about 5%. This material was thoroughly wetted with water so that the moisture content was about 50%, and the wet mixture was placed in the cavity of a cylindrical mold equipped with a tight-fitting piston and subjected to a pressure of 10,000 p.s.i. in the Carver press, there being produced a wet block or cake that could readily be broken by hand. Examination of the pressed cake under the microscope showed that substantially all of the particles had been reduced to a size of less than 10 microns. On removing the cake and drying it at room temperature, there was obtained a horn-like product having smooth ivory-like surfaces. It was noticed that a continuous translucent film was left adhering to the piston, and this film was also collected and dried, yielding a translucent, extremely hard, horn-like product having ivory-like surfaces. Both products were found to have good moisture resistance. When immersed in water, they remained intact for several hours, i.e., they did not disintegrate; rather, they tended to become plasticized in that they become somewhat rubbery to the touch. Both products were readily machinable, and their surfaces capable of taking on a high gloss.

*Example 3*

Cellulose crystallite aggregates were prepared by hydrolyzing Ketchikan sulfite wood pulp with 0.5% by weight HCl for 60 minutes at 250° F. The aggregates were washed once with deionized water, once with a 1% ammonium hydroxide solution, again with deionized water, after which they were dried in an oven at 65° C. for 24 hours under a vacuum of 29 inches of water. They had an average level-off D.P. of 220, a moisture content of about 5% by weight, and a particle size ranging from about 1 to 250 or 300 microns. A number of pressed discs were made, measuring 2¼ inches in diameter and 7/16 inch thick, by pressing the dried powdered aggregates at room temperature and at 10,000 p.s.i. in a simple mold positioned in a Carver press. Pressing increased the bulk density of the aggregates from approximately 0.3 for the powder to about 1.38 for the pressed discs. The discs were white, and very hard, the hardness being comparable to a molded article made from a molding composition comprising about 65% urea-formaldehyde resin and 35% alpha-cellulose filler. It was not possible to hammer a 3-inch building nail through a disc; the nail bent under the impact of the hammer rather than penetrate the disc. The discs had a heat conductivity value of 1.75 B.t.u./in./sq. ft./° F./hr., a specific heat of 0.4 B.t.u./lb./° F., and a density of 80 to 90 lbs./cu. ft. When subjected to the full blast of an oxyacetylene torch (3100–3300° C.) for a period of 15 seconds, a disc of crystallite aggregates withstood the flame substantially better than discs and other shapes made of nylon, Transite, Marinite, steel, hard wood, soft wood, or porcelain. When removed from the flame, the disc of aggregates had, at the point exposed to the flame, a central cavity in one side about ½ inch in diameter and extending approximately half way through the thickness of the disc. The area surrounding the cavity was flat and covered by a thin carbonized layer which, upon cutting the disc diametrically in half, was shown to be simply a surface effect. When viewed in cross-section, and compared with a control disc, each cut surface of the flame-treated disc halves appeared to be normal, apart from the cavity produced by the flame, and had an intensely white, opaque appearance. It was evident from the cut surfaces in the vicinity of the cavity that carbonization of the material had proceeded only layerwise, without disintegration of the product. It was noted that at the end of the 15-second exposure to the flame, the disc could be picked up immediately by grasping its edges by the fingers, and that on the side remote from the flame-exposed side, the disc was only warm, not hot, to the touch. This behavior was attributed to its very low heat conductivity. The nylon disc, measuring 2½" by 9/32", become white hot after 5 seconds, two large central holes being formed which pierced the disc, while the side exposed to the flame was concaved, indicating a flow of the material. A Marinite square, comprising pressed asbestos, 3" by 3" by 3/8", had a hole burned through after 5 seconds with some indication of flow. A Transite disc, 2¼" by 7/32" was burned through after 5 seconds. It was also made of asbestos. Both the Marinite and the Transite could be taken up in the hand, after removal of the flame, by grasping the pieces by the edges. A rectangular steel plate, 3½" by 2" by 3/8", showed a central cavity about 9/32" deep after only 3 seconds exposure to the flame; flow occurred, and the piece was white hot. Teflon, comprising a polytetrafluoroethylene disc 2½" by 9/32" was not pierced by the flame after 15 seconds, although a cavity about 7/32" deep was formed. There was evidence of flow. A piece of vulcanized fiber was pierced after 5 to 10 seconds. Porcelain in the form of a square, 4" by 9/32", was not pierced after 10 seconds; however a cavity was formed about 1/8" deep and there was evidence of flow. A piece of hard wood in the form of a disc, 2¼" by 3/8", was pierced after 5 seconds and the exposed side of the piece burst into flames. The opposite side showed charring. A piece of soft wood was even more extensively damaged after 5 seconds.

*Example 4*

Cellulose crystallite aggregates were prepared as in the preceding example and several discs were cold pressed, using a pressure of 35,000 to 40,000 p.s.i. The discs were about 1½ inches in diameter and ½ inch thick. They had a bulk density of 1.32 to 1.38, were very hard, white and opaque. The mold was provided with slight, vertically extending ridges, and the disc was able to reflect these ridges accurately, there being formed in its edges corresponding grooves.

*Example 5*

Cellulose crystallite aggregates were prepared by hydrolyzing Ketchikan sulfite wood pulp with a 0.5% by weight aqueous solution of HCl for 1 hour at 250° F., there being obtained a never dried material having an average level-off D.P. of 220 and a moisture content of 63.9%. This material was then made up into an aqueous mixture comprising 32% by weight of the aggregates and the balance water, and the mixture subjected to attrition in a stainless steel sigma blade mixing device. This comprised a rectangularly-shaped compartment having an open top and provided at the bottom with two side-by-side concaved portions separated by an upstanding ridge. A sigma blade was adapted to rotate in each concaved portion, one end of each blade being mounted to a side of the compartment and the other end being unmounted but disposed closely to the opposite side of the compartment. The clearances of the blades with the end surfaces of the compartment and with the surfaces of the concaved bottom portions were very small, being of the order of a few thousandths of an inch, say about eight-thousandths inch. The blades were power driven and were fully rotary while the compartment was stationary. The attriting action of the device upon the aggregates was in the nature of a rubbing or smearing one, the aggregates becoming lodged in the small clearances noted and being carried around within the compartment in a rotary manner by the motion of the blades. The aggregates were attrited for a period of 2 hours, there being formed a gel in the form of a fairly firm, cohesive dough. The latter was diluted with water to approximately 20% solids to give a very thick, smooth gel. This gel was allowed to dry down at room temperature until it had reached a moisture content of approximately 5%. The gel dried down to an ivory-like, distinctly opaque, very hard mass. This material machined very well, had the appearance of artificial ivory, and was unusually resistant to impact. If allowed to sit in water, however, it gradually softened and acquired first a rubbery and then a cheese-like consistency.

The following examples may illustrate the moisture resistance of several molded pieces in which a small amount of resin is incorporated.

*Example 6*

About 25 grams of a melamine-formaldehyde resin in powder form were stirred into 147 ml. of an aqueous solution of 0.5 normal HCl until dissolved, and the solution was then diluted to 208 ml. with distilled water. After standing for about 3 hours it was further diluted to 1250 ml. with distilled water, forming a 2% solution of the resin. Then 250 cc. of the 2% solution were added to 2 liters of distilled water, with mixing, and after the resin had become well dispersed, 95 grams of crystallite aggregates were added slowly and mixing continued for an hour. The aggregates were prepared by subjecting Ketchikan wood pulp to hydrolysis using a 0.5% by weight aqueous solution of HCl at 250° F. for one hour, there being produced cellulose crystallite aggregates having an average level-off D.P. of 220, a moisture content, after drying, of about 1% by weight, and a particle size in the range of 1 to 250 to 300 microns. The resulting mixture was filtered through nainsook cloth with the aid of a slight vacuum, and the filter cake was broken up by hand, allowed to dry at room temperature, and then ground with a pestle and mortar. Thereafter it was pressed at a pressure of 10,000 p.s.i. for 15 minutes at a temperature of 230° F. The resulting disk, comprising 5% by weight of resin and the balance crystallite aggregates, was able to resist the splitting action of water for 25 minutes, according to a test comprising placing the disc in cold water (room temperature) and observing the time required for the first crack or fissure to appear in it. Such behavior was distinctly superior to that of a control disc containing no resin.

*Example 7*

Ten grams of vinyl resin fibers, comprising fibers made from a copolymer of 88% of vinyl chloride and 12% of vinyl acetate, were cut into ¼ inch lengths and then dissolved in 1 liter of acetone. Thereafter 90 grams of crystallite aggregates, as prepared in Example 6, were slowly added, with mixing, to the resin-acetone solution. After standing 1 hour, water was added to the mixture in quantities sufficient to precipitate the resin on the aggregates. The mixture was then filtered through nainsook cloth, using a slight vacuum, and the filter cake was manually broken up and allowed to dry at room temperature. After preliminary grinding in a mortar and pestle, it was pressed under the conditions described in Example 6, the resulting pressed discs containing 10% by weight of the resin. They resisted the splitting action of water for 150 minutes.

*Example 8*

Ketchikan sulfite wood pulp was subjected to hydrolysis using a 0.5% by weight aqueous solution of HCl at 250° F. for one hour, there being produced cellulose crystallite aggregates having an average level-off D.P. of 220 and, after drying, a moisture content of about 4% by weight. The aggregates had a particle size in the range of 1 to 250 to 300 microns. Then 100 parts by weight of a novolak, comprising a phenol-formaldehyde condensation product, was taken and, while in a thermoplastic condition, was mixed with 10 parts of a curing agent comprising hexamethylenetetramine, after which the resin became thermosetting. The resulting mixture was mixed with the crystallite aggregate in a quantity sufficient to produce a molding composition comprising 90% by weight of aggregates and 10% by weight of the resin mix. This molding composition was used to form tan-colored molded discs, 2 inches in diameter by ⅛ inch thick, in a conventional laboratory molding press using a temperature of 300 to 330° F., a pressure in the range of 2,000 to 4,000 p.s.i., and a molding time of 10 minutes. Upon testing the discs for 16 hours at 73° F., 50% R.H., and a frequency of one megacycle, they exhibited a dielectric constant of 6.57; and after 72 hours testing at 73° F., 90% R.H., and one megacycle, the dielectric constant was 7.86. In a moisture resistance test, several discs were allowed to remain in boiling water for an hour and were found to be physically intact and to have picked up only 4% by weight of water. The discs had good impact strength.

Of interest is the fact that the formed products, particularly those pressed at the lower pressures, exhibit oil adsorption properties. Useful articles such as bearing materials may be produced by forming a product into a desired shape and then letting it soak in a suitable lubricant.

The flame resistance of the products suggests their use in electrical installations where arc resistance is a requirement.

The products do not expand or contract to any appreciable extent with changes in temperature, and they are also very resistant to cold flow, or creep, under applied pressure.

A noteworthy property is the very high compressive strength of the products; thus, at the higher forming pressures, special forming molds are required to withstand the pressures. In view of the very great thermal and physical strength of the products, their use is contemplated for quick-opening molds capable of withstanding high temperatures and pressures, and which, if desired, may be made to be disposable.

Porous products may be made by forming a gel of the crystallite aggregates, introducing air thereto, and then pressing and drying. Such a material is of value in thermal insulation applications where light weight is a requisite.

It may be noted that the cellulose crystallite aggregates are a plastic material as they are capable of being formed by the application of pressure. More particularly, they may be said to have hydroplastic properties because, when pressed in the presence of water, the latter helps the aggregates to be formed or shaped more readily.

As indicated, several procedures are suitable for mechanically disintegrating the aggregates, a preferred one being to subject them to a high speed cutting action in the presence of an aqueous medium. Water is the preferred medium. Other suitable media are aqueous mixtures comprising water and one or more water miscible, oxygen-containing compounds such as the polyols, comprising aliphatic compounds having two or more hydroxy groups. These include di-, tri-, and polyhydric alcohols such as ethylene glycol, diethylene glycol, glycerol, triethylene glycol, propylene glycol, etc. Glycol ethers are suitable, such as 2-ethoxyethanol, 2-methoxyethanol, 2-butoxyethanol; also the monoethyl ether of diethylene glycol or the monobutyl or monomethyl ethers of this glycol. Other polyols are the polyoxyethylene glycols having an average molecular weight of 200 to 4000 or more, particularly 200 to 600; methoxy polyoxyethylene glycols having an average molecular weight of 350 to 550; esters of polyoxyethylene glycols of average molecular weight of 200 to 6,000; and diesters of the latter glycols having average molecular weights of 1540 to 6,000. Other compounds are alkyl and alkylaryl ether derivatives of the polyoxyethylene glycols. Polyoxypropylene glycols of an average molecular weight of 150 to 425 are suitable, as are the water soluble polyoxyalkylene glycols, which contain recurring oxyethylene and oxypropylene groups. Water-miscible alcohols comprise a suitable class of compounds, and also organic acids, esters, aldehydes and ketones. Other compounds are ethers and oxides. Water may be omitted from any of the foregoing aqueous mixtures and the non-aqueous compound itself may be employed as the liquid medium in which the aggregates are disintegrated, particularly where such non-aqueous compound is both water soluble and liquid at room temperatures.

Although the invention has been described in connection with specific embodiments of the same, it will be understood that it is capable of obvious variations without departing from its scope.

In the light of the foregoing description, the following is claimed:

1. A unitary three-dimensional, self-supporting, heat- and impact-resistant structure consisting essentially of disintegrated cellulose crystallite aggregates at least part of which have a particle size less than 1 micron, said aggregates being held together in the form of the structure by mechanical inter-locking forces and also being interfacially bonded together by means of intermolecular bonding forces, said structure having a density in the range of 1.2 to 1.57 and being further characterized by being resistant to breakage when beaten with a hammer, by being resistant to piercing by a pointed metal object and by being free of amorphous cellulose.

2. A unitary three-dimensional, self-supporting, compressed heat- and impact-resistant, non-melting plastic structure consisting essentially of mechanically disintegrated cellulose crystallite aggregates at least part of which have a particle size less than 1 micron, said aggregates being held together in the form of the structure by mechanical interlocking forces and also being interfacially bonded together by means of intermolecular bonding forces, said structure having a density in the range of 1.2 to 1.57 and being further characterized by being resistant to breakage when beaten with a hammer, by being resistant to piercing by a pointed metal object and by being free of amorphous cellulose.

3. The structure of claim 2 characterized by having a horn-like appearance and smooth glossy surfaces.

References Cited by the Examiner

UNITED STATES PATENTS

| | | | |
|---|---|---|---|
| 1,458,542 | 6/1923 | Plauson | 260—212 |
| 2,623,874 | 12/1952 | Brown | 260—212 |
| 2,623,875 | 12/1952 | Schlosser et al. | 260—212 |
| 2,755,509 | 7/1956 | Smidth | 18—47.5 |
| 2,767,169 | 10/1956 | Gray et al. | 260—212 |
| 2,788,545 | 4/1957 | Bauer | 18—47.5 |
| 2,872,425 | 2/1959 | Paz | 260—17.3 |
| 2,873,260 | 2/1959 | Corwin | 260—17.3 |
| 2,978,446 | 4/1961 | Battista et al. | 260—212 |

OTHER REFERENCES

Ott et al.: High Polymer, 2nd ed., vol. 5, Cellulose and Cellulose Derivatives, part I, Interscience Pub., pages 269 and 430 relied on, QD 321, Q89 (1954).

LEON J. BERCOVITZ, *Primary Examiner.*

DANIEL ARNOLD, ABRAHAM H. WINKELSTEIN, WILLIAM H. SHORT, J. R. LIBERMAN,
*Examiners.*

J. A. SEIDLECK, R. S. AULL, J. M. DULIN, E. C. ELGIN, *Assistant Examiners.*